US012754797B2

(12) United States Patent
Sayyed et al.

(10) Patent No.: US 12,754,797 B2
(45) Date of Patent: Oct. 6, 2026

(54) MANAGING BOOT PERFORMANCE OF AN INFORMATION HANDLING SYSTEM

(71) Applicant: Dell Products L.P., Round Rock, TX (US)

(72) Inventors: Ibrahim Sayyed, Georgetown, TX (US); Laxmi Lavanya Medicherla, Georgetown, TX (US); Alan H. Abdelhalim, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 30 days.

(21) Appl. No.: 19/060,466

(22) Filed: Feb. 21, 2025

(65) Prior Publication Data

US 2026/0252435 A1 Aug. 27, 2026

(51) Int. Cl.
*G06F 11/00* (2006.01)
*G06F 11/07* (2006.01)

(52) U.S. Cl.
CPC ...... *G06F 11/0793* (2013.01); *G06F 11/0757* (2013.01); *G06F 11/079* (2013.01)

(58) Field of Classification Search
CPC ............. G06F 11/0793; G06F 11/0757; G06F 11/079; G06F 11/1417
USPC .............................................................. 713/2
See application file for complete search history.

(56) References Cited

U.S. PATENT DOCUMENTS

2011/0113229 A1* 5/2011 Itoh ....................... G06F 9/4418 713/2
2018/0300202 A1* 10/2018 Lambert ............... G06F 9/4405
2020/0089572 A1* 3/2020 Bodner ............... G06F 11/2284

* cited by examiner

*Primary Examiner* — Jason B Bryan
(74) *Attorney, Agent, or Firm* — McDermott Will & Schulte LLP

(57) ABSTRACT

Managing boot performance of an IHS, including performing an initial boot of the IHS, and in response, identifying an initial boot state of the IHS, including an initial boot start time; performing a subsequent boot of the IHS after the initial boot; identifying a subsequent boot state of the IHS, including a subsequent boot start time; automatically comparing the subsequent boot start time to the initial boot start time; determining whether the subsequent boot start time is greater than the initial boot start time; determining that the subsequent boot start time is greater than the initial boot start time, and in response: comparing the initial boot state of the IHS to the subsequent boot state of the IHS; identifying differences between the initial boot state and the subsequent boot state; performing, based on the identified differences and independent of user action, a remediation action at the IHS.

20 Claims, 3 Drawing Sheets

MANAGING BOOT PERFORMANCE OF AN INFORMATION HANDLING SYSTEM

BACKGROUND

Field of the Disclosure

The disclosure relates generally to an information handling system, and in particular, managing boot performance of the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Computer boot time refers to the duration it takes for a computer to start up and be ready for use after being powered on. This process involves initializing hardware components, loading the operating system, and starting essential background services. Reducing boot time can enhance user experience by allowing quicker access to applications and tasks.

SUMMARY

Innovative aspects of the subject matter described in this specification may be embodied in a method of managing boot performance of an information handling system, including: performing an initial boot of the information handling system; in response to the initial boot, identifying an initial boot state of the information handling system, including an initial boot start time; performing a subsequent boot of the information handling system after the initial boot; identifying a subsequent boot state of the information handling system, including a subsequent boot start time; automatically comparing the subsequent boot start time to the initial boot start time; determining, based on the comparing, whether the subsequent boot start time is greater than the initial boot start time; determining that the subsequent boot start time is greater than the initial boot start time, and in response: comparing the initial boot state of the information handling system to the subsequent boot state of the information handling system; identifying, based on the comparing, one or more differences between the initial boot state and the subsequent boot state; and performing, based on the identified differences and independent of user action, a remediation action at the information handling system.

Other embodiments of these aspects include corresponding systems, apparatus, and computer programs, configured to perform the actions of the methods, encoded on computer storage devices.

These and other embodiments may each optionally include one or more of the following features. For instance, wherein identifying the initial boot state of the information handling system further includes identifying an inventory of computing devices coupled to a motherboard of the information handling system and identifying the initial boot state of the computing devices of the information handling system, wherein identifying the subsequent boot state of the information handling system further includes identifying the subsequent boot state of the computing devices of the information handling system. Wherein identifying the initial boot state of the computing devices of the information handling system further includes, for each computing device, identifying i) an initial age of the computing device, ii) an initial firmware version of the computing device, iii) an initial firmware architecture version of a motherboard the computing device is coupled to, and iv) an initial configuration of the computing device, wherein identifying the subsequent boot state of the computing devices of the information handling system further includes, for each computing device, identifying i) a subsequent age of the computing device, ii) a subsequent firmware version of the computing device, iii) a subsequent firmware architecture version of the motherboard the computing device is coupled to, and iv) a subsequent configuration of the computing device. Comparing the initial boot state of the information handling system to the subsequent boot state of the information handling system further includes, for each computing device: comparing i) the initial age of the computing device to the subsequent age of the computing device, ii) the initial firmware version of the computing device to the subsequent firmware version of the computing device, iii) the initial firmware architecture version of the motherboard the computing device is coupled to to the subsequent firmware architecture version of the motherboard the computing device is coupled to, and iv) the initial configuration of the computing device to the subsequent configuration of the computing device. Identifying the one or more differences between the initial boot state and the subsequent boot state further includes identifying differences, for each computing device, between: i) the initial age of the computing device to the subsequent age of the computing device, ii) the initial firmware version of the computing device to the subsequent firmware version of the computing device, iii) the initial firmware architecture version of the motherboard the computing device is coupled to to the subsequent firmware architecture version of the motherboard the computing device is coupled to, and iv) the initial configuration of the computing device to the subsequent configuration of the computing device. Determining, for a particular computing device and based on the identified differences, that the subsequent boot start time is greater than the initial boot time based on one or more of the differences between: i) the initial age of the particular computing device to the subsequent age of the particular computing device, ii) the initial firmware version of the particular computing device to the subsequent firmware version of the particular computing device, iii) the initial firmware architecture version of the motherboard the particular computing device is coupled to to the subsequent firmware architecture version of the motherboard the particular computing device is coupled to; and iv) the initial configuration of the particular computing device to the subsequent configuration of the particular computing device. Determining that the subsequent boot start time is greater than the initial boot time based on the subsequent firmware version of the particular computing device, and in response, performing the remediation action including reverting the particular computing device to the initial firmware version. Determining that the subsequent boot start time is greater than the initial boot time based on the subsequent firmware architecture version of the particular computing device, and in response, performing the remediation action including reverting the motherboard to the initial firmware architecture version. Determining that the subsequent boot start time is greater than the initial boot time based on the subsequent configuration of the particular computing device, and in response, performing the remediation action including reverting the particular computing device to the initial configuration.

Particular implementations of the subject matter described in this specification can be implemented so as to realize one or more of the following advantages. For example, ensuring quick boot times enhances the overall user experience by minimizing delays and allowing users to start their work promptly. Automated monitoring of boot performance can trigger remediation actions when an increase is detected. Additionally, taking automatic snapshots of configuration information allows for reverting to older settings and/or rolling back BIOS/firmware updates.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
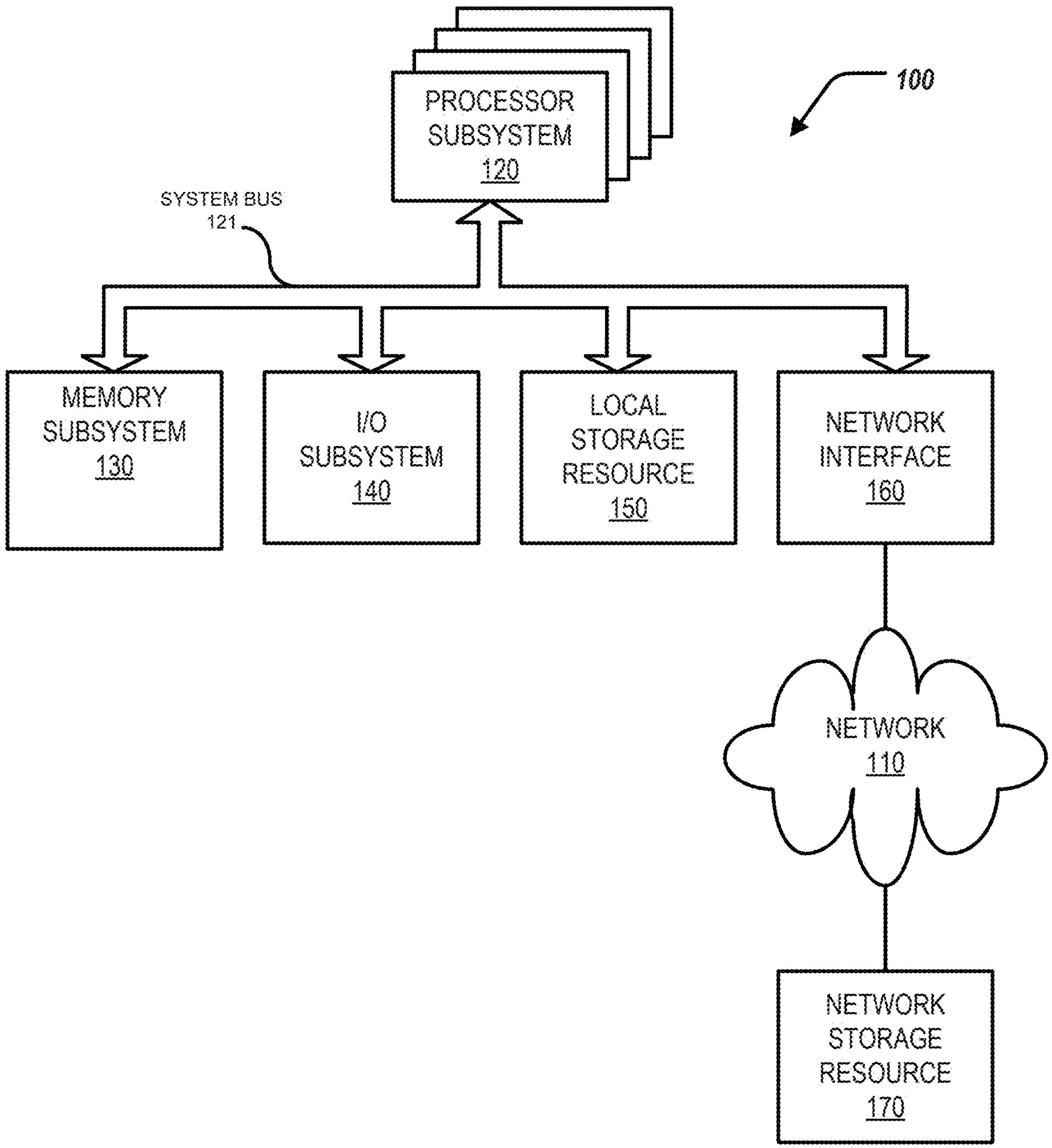
FIG. 1 is a block diagram of selected elements of an embodiment of an information handling system.

This disclosure discusses methods and systems for managing boot performance of an information handling system. In short, monitoring boot times of the information handling system can be important, particularly after hardware changes, firmware updates, system-wide UEFI BIOS updates, and as hardware ages. An increase in boot times can signal compatibility issues, inefficiencies, or failing components, all of which can negatively affect overall system performance. By keeping a close watch on boot times, we can ensure the system remains reliable, efficient, and optimized for high-performance tasks such as machine learning and data analysis. Longer BIOS boot times means users have to wait longer for the system to boot to the main OS, which can be frustrating and reduce productivity. Ensuring quick boot times enhances the overall user experience by minimizing delays and allowing users to start their work promptly. Automated monitoring of boot performance can trigger remediation actions when an increase is detected. Additionally, taking automatic snapshots of configuration information allows for reverting to older settings and/or rolling back BIOS/firmware updates.

Specifically, this disclosure discusses a system and a method for managing boot performance of an information handling system, including performing an initial boot of the information handling system; in response to the initial boot, identifying an initial boot state of the information handling system, including an initial boot start time; performing a subsequent boot of the information handling system after the initial boot; identifying a subsequent boot state of the information handling system, including a subsequent boot start time; automatically comparing the subsequent boot start time to the initial boot start time; determining, based on the comparing, whether the subsequent boot start time is greater than the initial boot start time; determining that the subsequent boot start time is greater than the initial boot start time, and in response: comparing the initial boot state of the information handling system to the subsequent boot state of the information handling system; identifying, based on the comparing, one or more differences between the initial boot state and the subsequent boot state; and performing, based on the identified differences and independent of user action, a remediation action at the information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Figure 2:
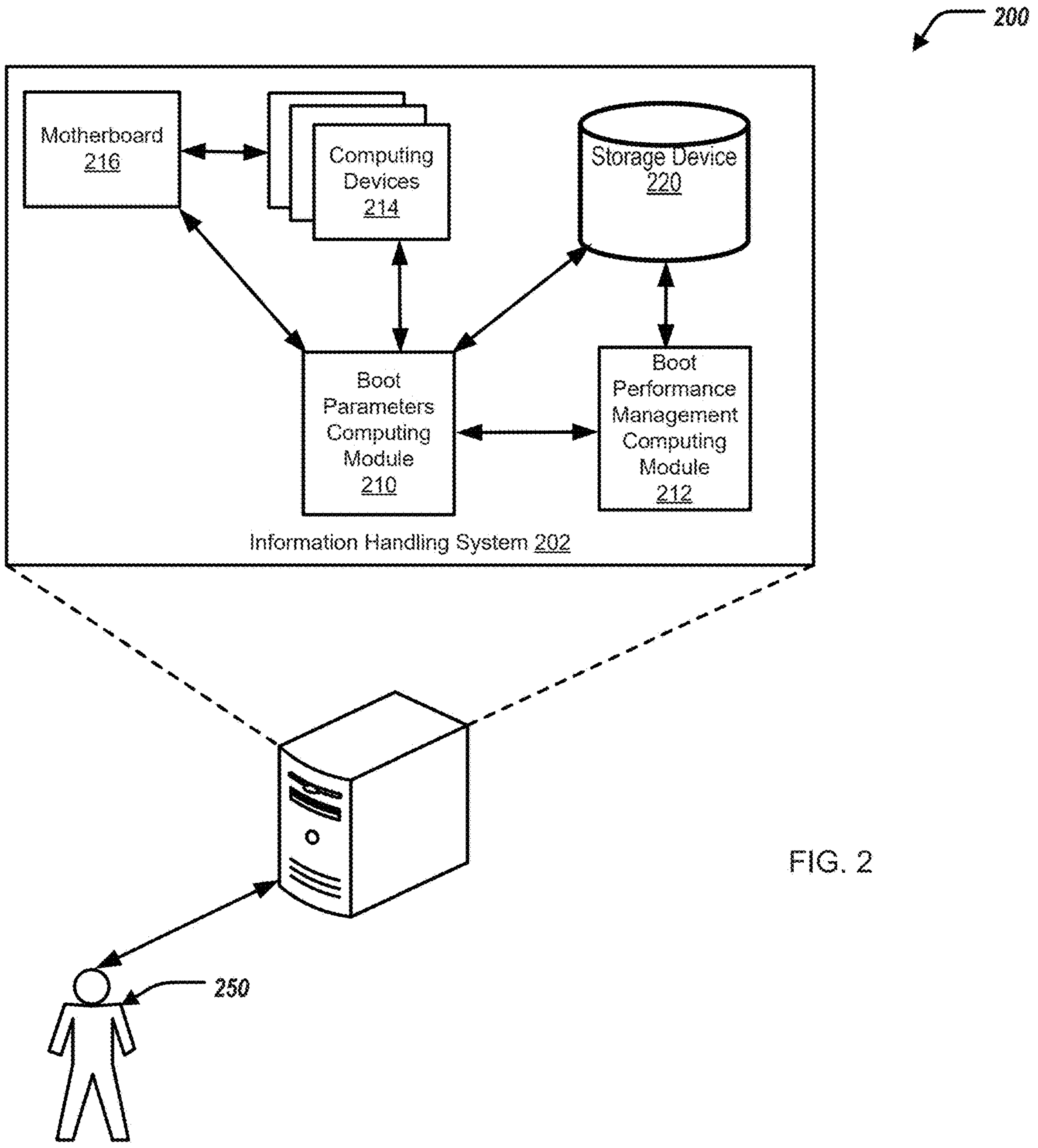
FIG. 2 illustrates a block diagram of an information handling system for managing boot performance of the information handling system.
Figure 3:
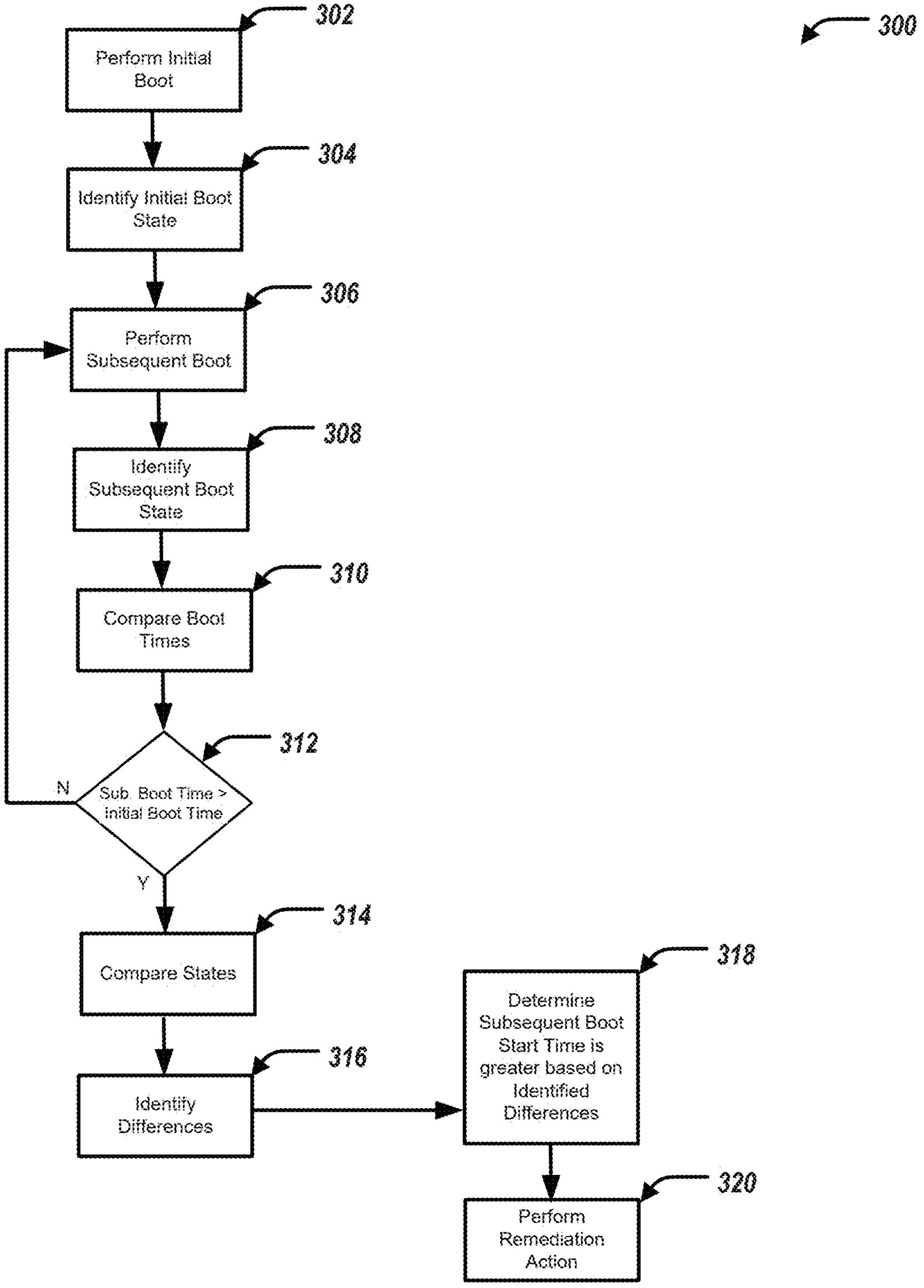
FIG. 3 illustrates a method for managing boot performance of the information handling system.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include one or more processing resources such as a central processing unit (CPU), microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system 100). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, a camera, or another type of peripheral device.

Local storage resource 150 may comprise computer-readable media (e.g., hard disk drive, floppy disk drive, CD-ROM, and/or other types of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other types of rotating storage media, flash memory, EEPROM, and/or other types of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g., corporate) network. The network may be implemented as, or may be a part of, a storage area network (SAN), a personal area network (PAN), a local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet, or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Turning to FIG. 2, FIG. 2 illustrates an environment 200 including an information handling system 202. The information handling system 202 can include a boot parameters computing module 210, a boot performance management computing module 212, computing devices 214, a motherboard 216, and a storage device 220. In some examples, the information handling system 202 is similar to, or includes, the information handling system 100 of FIG. 1.

The boot parameters computing module 210 can be in communication with the boot performance management computing module 212, the computing devices 214, the motherboard 216, and the storage device 220. The boot performance management computing module 212 can be in communication with the boot parameters computing module 210 and the storage device 220. The computing devices 214 can be coupled to the motherboard 216.

In short, monitoring boot times of the information handling system 202 can be important, particularly after hardware changes, firmware updates, system-wide UEFI BIOS updates, and as hardware ages. An increase in boot times can signal compatibility issues, inefficiencies, or failing components, all of which can negatively affect overall system performance. By keeping a close watch on boot times, we can ensure the system remains reliable, efficient, and optimized for high-performance tasks such as machine learning and data analysis. Longer BIOS boot times means users have to wait longer for the system to boot to the main OS, which can be frustrating and reduce productivity. Ensuring quick boot times enhances the overall user experience by minimizing delays and allowing users to start their work promptly. Automated monitoring of boot performance can trigger remediation actions when an increase is detected. Additionally, taking automatic snapshots of configuration information allows for reverting to older settings and/or rolling back BIOS/firmware updates.

FIG. 3 illustrates a flowchart depicting selected elements of an embodiment of a method 300 for managing boot performance of the information handling system. The method 300 may be performed by the information handling system 100, the information handling system 202, the boot parameters computing module 210, and/or the boot performance management computing module 212, and with reference to FIGS. 1-2. It is noted that certain operations described in method 300 may be optional or may be rearranged in different embodiments.

The information handling system 202 is initially booted, at 302. The boot parameters computing module 210, in response to the initial boot of the information handling system 202, identifies an initial boot state of the information handling system 202, at 304. Specifically, the boot parameters computing module 210 identifies an inventory of the computing devices 214 coupled to the motherboard 216, and identifies an initial boot state of the computing devices 214. In some examples, the boot parameters computing module 210 identifies the initial boot state of the computing devices 214 including, identifying, for each computing device 214, i) an initial age of the computing device 214, ii) an initial firmware version (UEFI BIOS version) of the computing device 214, iii) an initial firmware architecture version of the motherboard 216, and iv) an initial configuration of the computing device 214 (or BIOS). In some examples, the boot parameters computing module 210 can further identify an initial boot start time of the information handling system 202 (device performance startup time or BIOS boot time).

In some examples, the boot parameters computing module 210 stores data indicating the initial boot state of the information handling system, and the boot parameters of the information handling system 202 and the computing devices 214 at the storage device 220.

In some examples, the initial boot state of the information handling system 202 can be based on the initial boot state of the information handling system 202 prior to shipment of the information handling system 202 from a manufacturer of the information handling system 202 (e.g., to the end user of the information handling system 202). The initial boot state and initial boot parameters of the information handling system 202 and the computing devices 214 can be stored (as data) at the storage devices 220.

In some examples, the boot parameters computing module 210 can notify the boot performance management computing module 212 of the boot parameter data stored at the storage device 220, and/or the boot performance management computing module 212 can periodically check the storage device 220 for such data.

The information handling system 202 performs a subsequent boot, at 306. The subsequent boot of the information handling system 202 is after the initial boot of the information handling system 202. The boot parameters computing module 210, in response to the subsequent boot of the information handling system 202, identifies a subsequent boot state of the information handling system 202, at 308. Specifically, the boot parameters computing module 210 identifies a subsequent boot state of the computing devices 214. In some examples, the boot parameters computing module 210 identifies the subsequent boot state of the computing devices 214 including, identifying, for each computing device 214, i) a subsequent age of the computing device 214, ii) a subsequent firmware version (UEFI BIOS version) of the computing device 214, iii) a subsequent firmware architecture version of the motherboard 216, and iv) a subsequent configuration of the computing device 214 (or BIOS). In some examples, the boot parameters computing module 210 can further identify a subsequent boot start time of the information handling system 202 (device performance startup time or BIOS boot time).

In some examples, the boot parameters computing module 210 stores data indicating the subsequent boot state of the information handling system, and the boot parameters of the information handling system 202 and the computing devices 214 at the storage device 220. In some examples, the boot parameters computing module 210 can notify the boot performance management computing module 212 of the boot parameter data stored at the storage device 220, and/or the boot performance management computing module 212 can periodically check the storage device 220 for such data.

The boot parameters computing module 210 compares the subsequent boot start time to the initial boot start time, at 310. The boot parameters computing module 210 determines, based on the comparing, whether the subsequent boot start time of the information handling system 202 is greater than the initial boot start time of the information handling system 202, at 312.

In some examples, the boot parameters computing module 210 determines that the subsequent boot start of the information handling system 202 is greater than the initial boot start time of the information handling system 202 (at 312), and in response, the boot performance management computing module 212 automatically compares the initial boot state of the information handling system 202 to the subsequent boot state of the information handling system, at 314. Specifically, when the boot parameters computing module 210 determines that the subsequent boot start of the information handling system 202 is greater than the initial boot start time of the information handling system 202, the boot parameters computing module 210 provides a notification to the boot performance management computing module 212 of such. The boot performance management computing module 212, in response to such a notification, can obtain data indicating the initial boot state and the subsequent boot state of the information handling system 202 from the storage device 220.

In some examples, when the boot performance management computing module 212 automatically compares the initial boot state of the information handling system 202 to the subsequent boot state of the information handling system, the boot performance management computing module 212, for each computing device 214, automatically compares i) the initial age of the computing device 214 to the subsequent age of the computing device 214, ii) the initial firmware version of the computing device 214 to the subsequent firmware version of the computing device 214, iii) the initial firmware architecture version of the motherboard 216 to the subsequent firmware architecture version of the motherboard 216, and iv) the initial configuration of the computing device 214 (or BIOS) to the subsequent configuration of the computing device 214 (or BIOS).

The boot performance management computing module 212 identifies, based on the comparing, one or more differences between the initial boot state of the information handling system 202 and the subsequent boot state of the information handling system 202, at 316. That is, the boot performance management computing module 212 analyzes the changes or differences between the boot states of the information handling system 202, and determines a source of the increased boot time of the information handling system 202. In some examples, the boot performance management computing module 212 identifies the differences between the initial boot state of the information handling system 202, and the subsequent boot state of the information handling system 202 includes identifying differences, for each computing device 214, between i) the initial age of the computing device 214 to the subsequent age of the computing device 214, ii) the initial firmware version of the computing device 214 to the subsequent firmware version of the computing device 214, iii) the initial firmware architecture version of the motherboard 216 to the subsequent firmware architecture version of the motherboard 216, and iv) the initial configuration of the computing device 214 or (BIOS) to the subsequent configuration of the computing device 214 (or BIOS).

The boot performance management computing module 212 determines, for a particular computing device 214 and based on the identified differences, that the subsequent boot start time is greater than the initial boot time based on one or more of the identified differences, at 318. That is, the boot performance management computing module 212 determines which of the identified differences leads to the increase in the boot start time of the information handling system 202. Specifically, the boot performance management computing module 212 determines, for a particular computing device 214, the cause of the subsequent boot start time being greater than the initial boot time of one or more of a difference between i) the initial age of the particular computing device 214 to the subsequent age of the particular computing device 214, ii) the initial firmware version of the particular computing device 214 to the subsequent firmware version of the particular computing device 214, iii) the initial firmware architecture version of the motherboard 216 to the subsequent firmware architecture version of the motherboard 216; and iv) the initial configuration of the particular computing device 214 to the subsequent configuration of the particular computing device 214. In some examples, the boot performance management computing module 212 determines, for multiple computing devices 214, that the subsequent boot start time is greater than the initial boot time based on one or more of the identified differences across the multiple computing devices 214. In short, the boot performance management computing module 212 determines whether the increased boot time of the information handling system 202 is due to a new configuration of the computing devices 214, aging of the computing devices 214, firmware updates of the computing devices 214, or firmware updates of the motherboard 216.

The boot performance management computing module 212 can store data at the storage device 220 that indicates the identified differences of the computing devices 214 that leads to the increase in the boot start time of the information handling system 202.

The boot performance management computing module 212 performs the remediation action based on the identified differences and independent of user action by a user 250 of the information handling system, at 320. That is, the boot performance management computing module 212 performs the remediation action at the information handling system 202 (and specifically, at the computing devices 214 and/or the motherboard 216) automatically in response to determining that the remediation action is to be performed and without user interaction/input. The boot performance management computing module 212 can perform the remediation action (or remediation actions) to decrease the boot time of the information handling system 202 by improving computational capabilities of the information handling system 202 (such as the computing devices 214 and/or the motherboard 216). That is, performing the remediation action(s) to the computing devices 214 and/or the motherboard 216 by the boot performance management computing module 212 improves the computational/performance capabilities of the information handling system 202 (the computing devices 214 and/or the motherboard 216) such that the boot time of the information handling system 202 is decreased. In some examples, the boot performance management computing module 212 can perform the remediation action (or remediation actions) to decrease the boot time of the information handling system 202 without user action/input by the user 250 (independent of user action/input by the user 250).

In some examples, the boot performance management computing module 212 performs the remediation action of reverting (rollback) the particular computing device 214 (or multiple computing devices 214) to the initial firmware version from the subsequent firmware version. That is, the boot performance management computing module 212 performs the remediation action of reverting (rollback) the particular computing device 214 to the initial firmware version from the subsequent firmware version by replacing the subsequent firmware version of the particular computing device 214 with the initial firmware version. In some examples, the boot performance management computing module 212 performs the remediation action of reverting (rollback) the motherboard 216 to the initial firmware architecture version from the subsequent firmware architecture. That is, the boot performance management computing module 212 performs the remediation action of reverting (rollback) the motherboard 216 to the initial firmware version from the subsequent firmware version by replacing the subsequent firmware version of the motherboard 216 with the initial firmware version. In some examples, the boot performance management computing module 212 performs the remediation action of reverting (rollback) the particular computing device 214 (or multiple computing devices 214) (or BIOS) to the initial configuration from the subsequent configuration. That is, the boot performance management computing module 212 performs the remediation action of reverting (rollback) the particular computing device 214 (or BIOS) to the initial configuration from the subsequent configuration by replacing the subsequent configuration of the particular computing device 214 (or BIOS) with the initial configuration.

In some examples, the boot performance management computing module 212 provides a notification at the information handling system 202 (e.g., via a graphical user interface element at a graphical user interface of a display device of the information handling system 202) regarding the increased boot time of the information handling system 202 and remediation actions that can be performed at the information handling system 202 to decrease the boot time of the information handling system 202. The user 250 can provide input via an input device (e.g., keyboard or mouse) to the information handling system 202 indicating to perform the remediation action or not. In some examples, the boot performance management computing module 212 receives, in response to the notification, user input indicating to proceed with the remediation action. The boot performance management computing module 212 can then proceed with the remediation action, as described herein. In some examples, the boot performance management computing module 212 receives, in response to the notification, user input indicating to not proceed with the mediation action, and maintains the subsequent boot state of the information handling system 202.

In a use case, a device configuration of one or more of the computing devices 214 has been updated to optimize the information handling system 202 for a new computer-implemented application at the information handling system 202. After such updates to the device configurations of the computing devices 214 were made, the information handling system 202 suffered from an increase in system boot time and decrease in overall computing performance. The boot time of the information handling system 202 is determined after the configuration update of the computing devices 214, including capturing a snapshot of the computing device 214 inventory, firmware versions of the computing devices 214, UEFI BIOS versions of the computing devices 214, and device performance startup time. Upon detecting the increase in the boot time, the boot performance management computing module 212 compares the current boot state of the information handling system 202 to an initial (or golden) boot state of the information handling system 202. The boot performance management computing module 212 analyzes whether the increased boot time is due to a new configuration of the computing devices 214, the age of the computing devices 214, firmware updates of the computing devices 214, or firmware updates of the motherboard 216. The boot performance management computing module 212 recommends remediation actions based on the analysis, including actions such as optimizing the new configuration or reverting to a previous boot state. A notification is provided to the user 250 indicating the remediation actions to be taken, or to remain in the current boot state.

In a use case, a device configuration of one or more of the computing devices 214 has been updated to optimize the information handling system 202 for a new computer-implemented application at the information handling system 202. After such updates to the device configurations of the computing devices 214 were made, the information handling system 202 suffered from an increase in system boot time and decrease in overall computing performance. The boot time of the information handling system 202 is determined after the configuration update of the computing devices 214, including capturing a snapshot of the computing device 214 inventory, firmware versions of the computing devices 214, UEFI BIOS versions of the computing devices 214, and device performance startup time. Upon detecting the increase in the boot time, the boot performance management computing module 212 compares the current boot state of the information handling system 202 to an initial (or golden) boot state of the information handling system 202. The boot performance management computing module 212 analyzes whether the increased boot time is due to a new configuration of the computing devices 214, the age of the computing devices 214, firmware updates of the computing devices 214, or firmware updates of the motherboard 216. The boot performance management computing module 212 recommends remediation actions based on the analysis, including actions such as recommending to replace one or more of the computing devices 214 . . . . A notification is provided to the user 250 indicating the remediation actions to be taken, or to remain in the current boot state.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A computer-implemented method of managing boot performance of an information handling system, including:

performing an initial boot of the information handling system;

in response to the initial boot, identifying an initial boot state of the information handling system, including an initial boot start time;

performing a subsequent boot of the information handling system after the initial boot;

identifying a subsequent boot state of the information handling system, including a subsequent boot start time;

automatically comparing the subsequent boot start time to the initial boot start time;

determining, based on the comparing, whether the subsequent boot start time is greater than the initial boot start time;

determining that the subsequent boot start time is greater than the initial boot start time, and in response:

comparing the initial boot state of the information handling system to the subsequent boot state of the information handling system;

identifying, based on the comparing, one or more differences between the initial boot state and the subsequent boot state; and performing, based on the identified differences and independent of user action, a remediation action at the information handling system.

2. The computer-implemented method of claim 1, wherein identifying the initial boot state of the information handling system further includes identifying an inventory of computing devices coupled to a motherboard of the information handling system and identifying an initial boot state of the computing devices of the information handling system, wherein identifying the subsequent boot state of the information handling system further includes identifying a subsequent boot state of the computing devices of the information handling system.

3. The computer-implemented method of claim 2, wherein identifying the initial boot state of the computing devices of the information handling system further includes, for each computing device, identifying i) an initial age of the computing device, ii) an initial firmware version of the computing device, iii) an initial firmware architecture version of a motherboard the computing device is coupled to, and iv) an initial configuration of the computing device, wherein identifying the subsequent boot state of the computing devices of the information handling system further includes, for each computing device, identifying i) a subsequent age of the computing device, ii) a subsequent firmware version of the computing device, iii) a subsequent firmware architecture version of the motherboard the computing device is coupled to, and iv) a subsequent configuration of the computing device.

4. The computer-implemented method of claim 3, wherein comparing the initial boot state of the information handling system to the subsequent boot state of the information handling system further includes, for each computing device:

comparing i) the initial age of the computing device to the subsequent age of the computing device, ii) the initial firmware version of the computing device to the subsequent firmware version of the computing device, iii) the initial firmware architecture version of the motherboard the computing device is coupled to the subsequent firmware architecture version of the motherboard the computing device is coupled to, and iv) the initial configuration of the computing device to the subsequent configuration of the computing device.

5. The computer-implemented method of claim 4, wherein identifying the one or more differences between the initial boot state and the subsequent boot state further includes identifying differences, for each computing device, between:

i) the initial age of the computing device to the subsequent age of the computing device, ii) the initial firmware version of the computing device to the subsequent firmware version of the computing device, iii) the initial firmware architecture version of the motherboard the computing device is coupled to the subsequent firmware architecture version of the motherboard the computing device is coupled to, and iv) the initial configuration of the computing device to the subsequent configuration of the computing device.

6. The computer-implemented method of claim 5, further including:

determining, for a particular computing device and based on the identified differences, that the subsequent boot start time is greater than the initial boot start time as a result of one or more of the differences between:

i) the initial age of the particular computing device to the subsequent age of the particular computing device, ii) the initial firmware version of the particular computing device to the subsequent firmware version of the particular computing device, iii) the initial firmware architecture version of the motherboard the particular computing device is coupled to the subsequent firmware architecture version of the motherboard the particular computing device is coupled to; and iv) the initial configuration of the particular computing device to the subsequent configuration of the particular computing device.

7. The computer-implemented method of claim 6, further including:

determining that the subsequent boot start time is greater than the initial boot start time as a result of the subsequent firmware version of the particular computing device, and in response, performing the remediation action including reverting the particular computing device to the initial firmware version.

8. The computer-implemented method of claim 6, further including:

determining that the subsequent boot start time is greater than the initial boot start time as a result of the subsequent firmware architecture version of the particular computing device, and in response, performing the remediation action including reverting the motherboard to the initial firmware architecture version.

9. The computer-implemented method of claim 6, further including:

determining that the subsequent boot start time is greater than the initial boot start time as a result of the subsequent configuration of the particular computing device, and in response, performing the remediation action including reverting the particular computing device to the initial configuration.

10. An information handling system comprising a processor having access to memory media storing instructions executable by the processor to perform operations, comprising:

performing an initial boot of the information handling system;

in response to the initial boot, identifying an initial boot state of the information handling system, including an initial boot start time;

performing a subsequent boot of the information handling system after the initial boot;

identifying a subsequent boot state of the information handling system, including a subsequent boot start time;

automatically comparing the subsequent boot start time to the initial boot start time;

determining, based on the comparing, whether the subsequent boot start time is greater than the initial boot start time;

determining that the subsequent boot start time is greater than the initial boot start time, and in response:

comparing the initial boot state of the information handling system to the subsequent boot state of the information handling system;

identifying, based on the comparing, one or more differences between the initial boot state and the subsequent boot state; and performing, based on the identified differences and independent of user action, a remediation action at the information handling system.

11. The information handling system of claim 10, wherein identifying the initial boot state of the information handling system further includes identifying an inventory of computing devices coupled to a motherboard of the information handling system and identifying an initial boot state of the computing devices of the information handling system, wherein identifying the subsequent boot state of the information handling system further includes identifying a subsequent boot state of the computing devices of the information handling system.

12. The information handling system of claim 11, wherein identifying the initial boot state of the computing devices of the information handling system further includes, for each computing device, identifying i) an initial age of the computing device, ii) an initial firmware version of the computing device, iii) an initial firmware architecture version of a motherboard the computing device is coupled to, and iv) an initial configuration of the computing device, wherein identifying the subsequent boot state of the computing devices of the information handling system further includes, for each computing device, identifying i) a subsequent age of the computing device, ii) a subsequent firmware version of the computing device, iii) a subsequent firmware architecture version of the motherboard the computing device is coupled to, and iv) a subsequent configuration of the computing device.

13. The information handling system of claim 12, wherein comparing the initial boot state of the information handling system to the subsequent boot state of the information handling system further includes, for each computing device:

comparing i) the initial age of the computing device to the subsequent age of the computing device, ii) the initial firmware version of the computing device to the subsequent firmware version of the computing device, iii) the initial firmware architecture version of the motherboard the computing device is coupled to to the subsequent firmware architecture version of the motherboard the computing device is coupled to, and iv) the initial configuration of the computing device to the subsequent configuration of the computing device.

14. The information handling system of claim 13, wherein identifying the one or more differences between the initial boot state and the subsequent boot state further includes identifying differences, for each computing device, between:

i) the initial age of the computing device to the subsequent age of the computing device, ii) the initial firmware version of the computing device to the subsequent firmware version of the computing device, iii) the initial firmware architecture version of the motherboard the computing device is coupled to to the subsequent firmware architecture version of the motherboard the computing device is coupled to, and iv) the initial configuration of the computing device to the subsequent configuration of the computing device.

15. The information handling system of claim 14, the operations further including:

determining, for a particular computing device and based on the identified differences, that the subsequent boot start time is greater than the initial boot start time as a result of one or more of the differences between:

i) the initial age of the particular computing device to the subsequent age of the particular computing device, ii) the initial firmware version of the particular computing device to the subsequent firmware version of the particular computing device, iii) the initial firmware architecture version of the motherboard the particular computing device is coupled to to the subsequent firmware architecture version of the motherboard the particular computing device is coupled to; and iv) the initial configuration of the particular computing device to the subsequent configuration of the particular computing device.

16. The information handling system of claim 15, the operations further including:

determining that the subsequent boot start time is greater than the initial boot start time as a result of the subsequent firmware version of the particular computing device, and in response, performing the remediation action including reverting the particular computing device to the initial firmware version.

17. The information handling system of claim 16, the operations further including:

determining that the subsequent boot start time is greater than the initial boot start time as a result of the subsequent firmware architecture version of the particular computing device, and in response, performing the remediation action including reverting the motherboard to the initial firmware architecture version.

18. A non-transitory computer-readable medium storing software comprising instructions executable by one or more computers which, upon such execution, cause the one or more computers to perform operations comprising:

performing an initial boot of the information handling system;

in response to the initial boot, identifying an initial boot state of the information handling system, including an initial boot start time;

performing a subsequent boot of the information handling system after the initial boot;

identifying a subsequent boot state of the information handling system, including a subsequent boot start time;

automatically comparing the subsequent boot start time to the initial boot start time;

determining, based on the comparing, whether the subsequent boot start time is greater than the initial boot start time;

determining that the subsequent boot start time is greater than the initial boot start time, and in response:

comparing the initial boot state of the information handling system to the subsequent boot state of the information handling system;

identifying, based on the comparing, one or more differences between the initial boot state and the subsequent boot state; and performing, based on the identified differences and independent of user action, a remediation action at the information handling system.

19. The non-transitory computer-readable medium of claim 18, wherein identifying the initial boot state of the information handling system further includes identifying an inventory of computing devices coupled to a motherboard of the information handling system and identifying an initial boot state of the computing devices of the information handling system, wherein identifying the subsequent boot state of the information handling system further includes identifying a subsequent boot state of the computing devices of the information handling system.

20. The non-transitory computer-readable medium of claim 19, wherein identifying the initial boot state of the computing devices of the information handling system further includes, for each computing device, identifying i) an initial age of the computing device, ii) an initial firmware version of the computing device, iii) an initial firmware architecture version of a motherboard the computing device is coupled to, and iv) an initial configuration of the computing device, wherein identifying the subsequent boot state of the computing devices of the information handling system further includes, for each computing device, identifying i) a subsequent age of the computing device, ii) a subsequent firmware version of the computing device, iii) a subsequent firmware architecture version of the motherboard the computing device is coupled to, and iv) a subsequent configuration of the computing device.

* * * * *